Nov. 24, 1931.  E. F. BATTERMAN ET AL  1,833,601
CENTER DRIVE LATHE
Filed Nov. 13, 1929  4 Sheets-Sheet 3
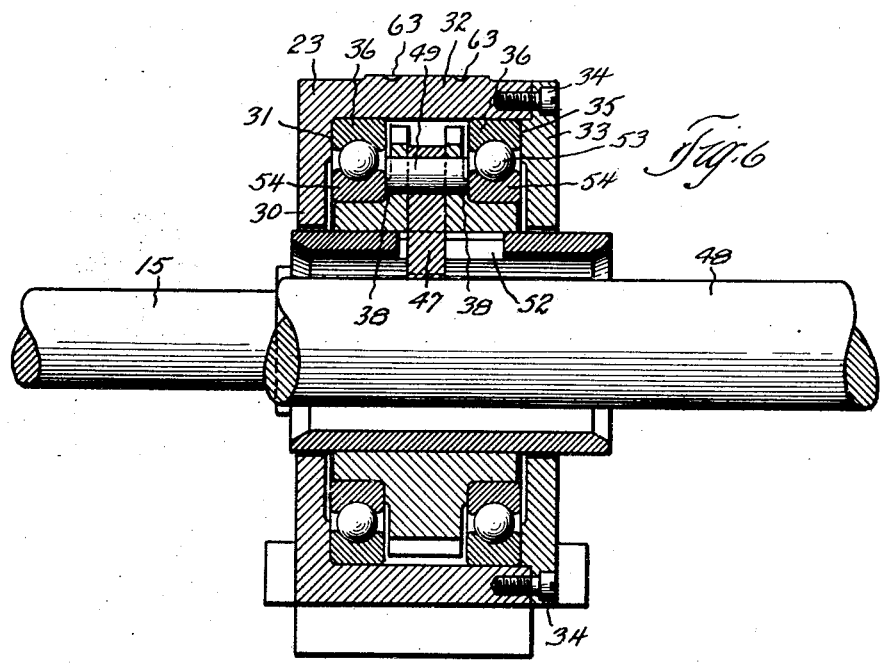
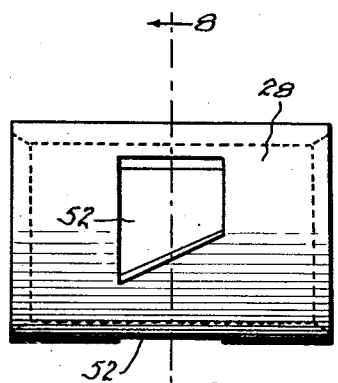
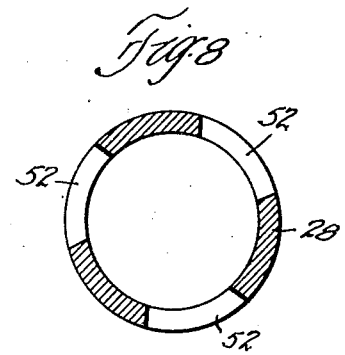
Inventor
Elmer F. Batterman
Joseph Verdorber
By Hull Brock +west
Attorney

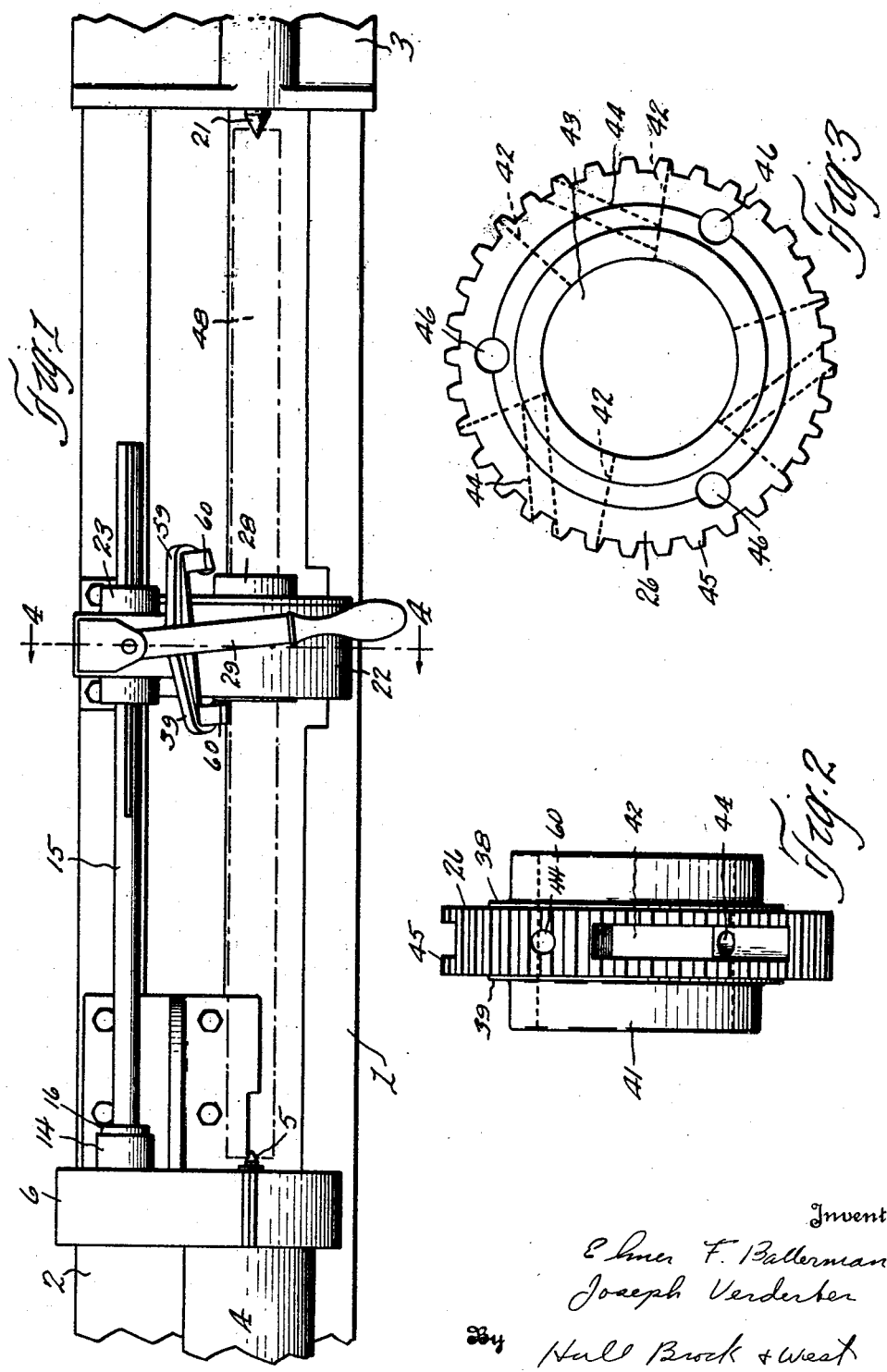

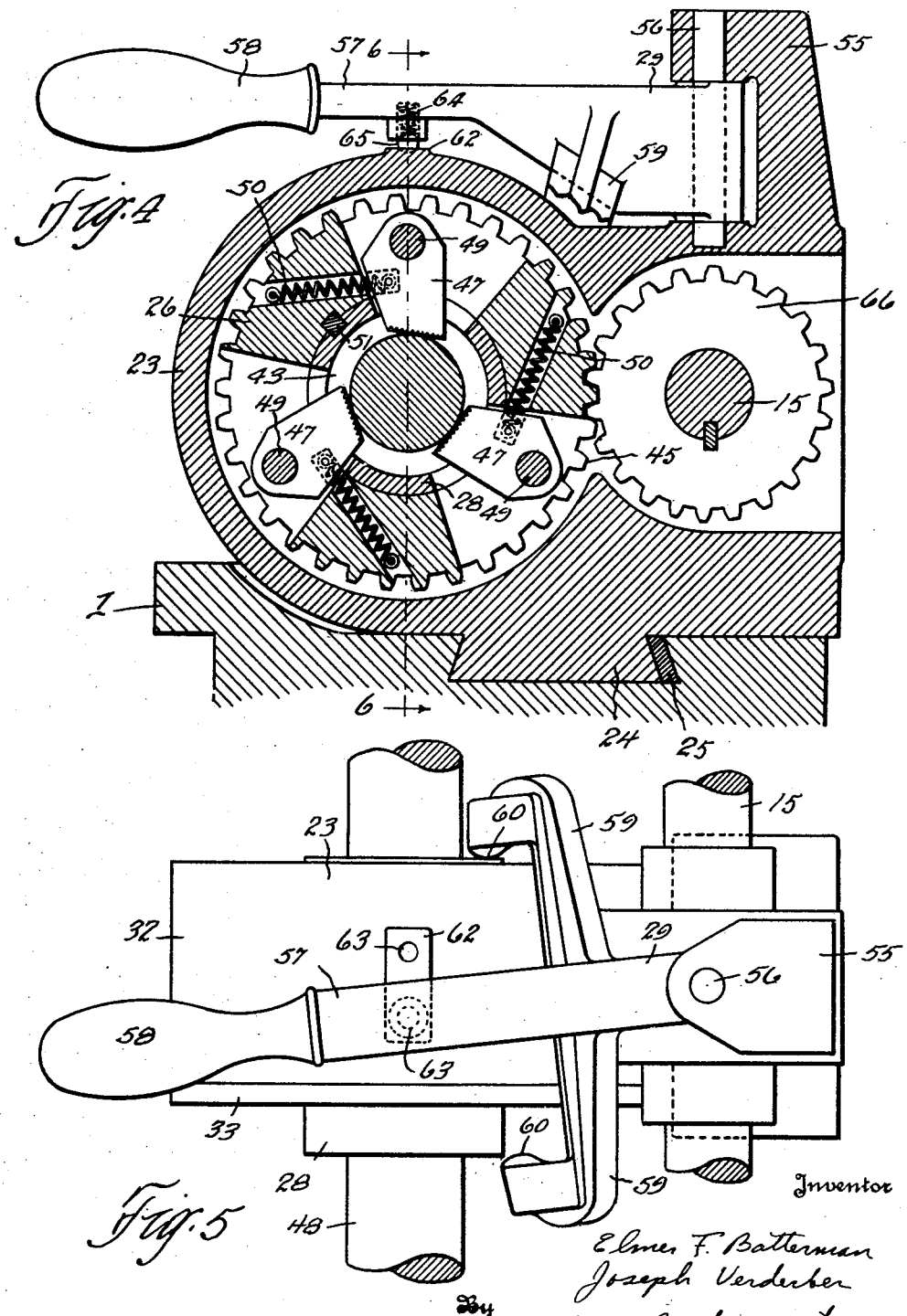

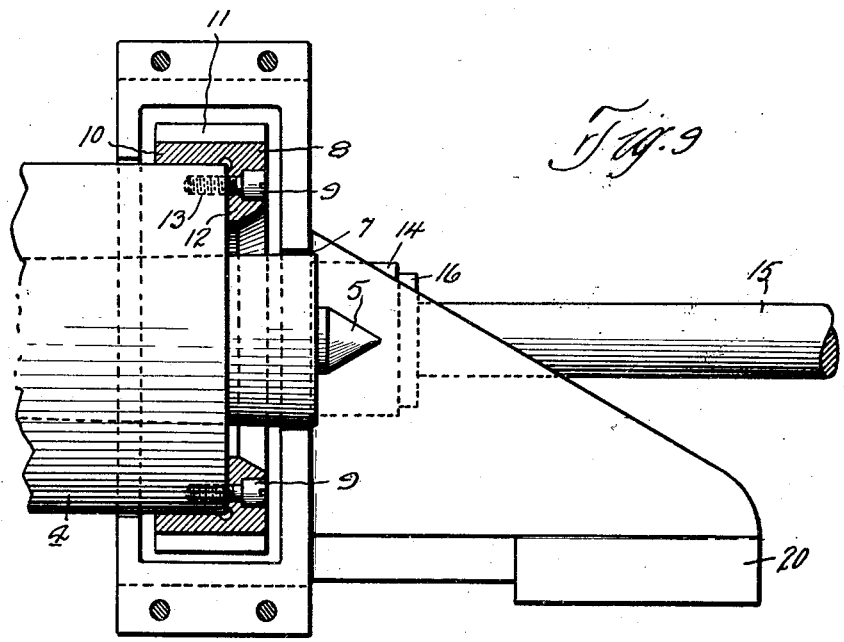
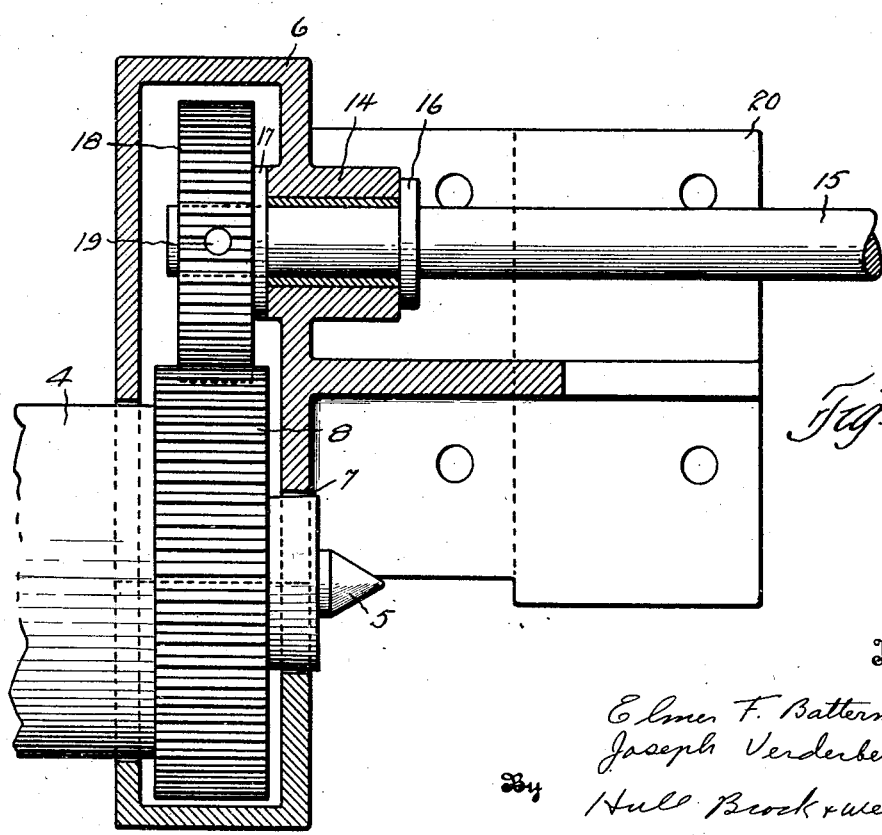

Patented Nov. 24, 1931

1,833,601

UNITED STATES PATENT OFFICE

ELMER F. BATTERMAN AND JOSEF VERDERBER, OF CLEVELAND, OHIO

CENTER DRIVE LATHE

Application filed November 13, 1929. Serial No. 406,783.

This invention relates to a lathe of the type used especially for machining the ends of automobile axles. These axles when ready to have such machining process performed are usually provided with indentations in the ends to receive the centering pins of a lathe, but often they are not symmetrical with respect to a line joining such indentations.

One of the objects of this invention is to provide a lathe which will be efficient for the purpose of performing this machining process irrespective of the exact symmetry of the axle member with respect to the aforesaid line. A further object of this invention is to provide a lathe having the chuck thereof positioned between the headstock and tailstock in order that both ends of the work, which may be an automobile axle, may be machined at the same time. Further and more specific objects will become apparent as the description proceeds.

We accomplish the foregoing and other objects through the construction and arrangement of parts shown in the drawings wherein Fig. 1 is a plan view of my improved lathe construction;

Fig. 2 is a detail side elevation of the chuck driving gear;

Fig. 3 is a detail end elevation of the same gear;

Fig. 4 is a partial section on the line 4—4 of Fig. 1 looking in the direction of the arrows;

Fig. 5 is an enlarged plan view of the chuck;

Fig. 6 is a section on line 6—6 of Fig. 4;

Fig. 7 is a detail elevation of a dog shifting sleeve;

Fig. 8 is a section of the sleeve on line 8—8 of Fig. 7;

Fig. 9 is a sectional elevation of the headstock; and

Fig. 10 is a plan section of the same.

Describing the various parts by reference characters, the lathe bed is indicated by the numeral 1 and the headstock and tailstock generally by the numerals 2 and 3 respectively. The headstock includes the usual rotating member 4 and centering pin 5 mounted in any suitable manner on the bed 1. In the preferred embodiment of my invention, there is a housing 6 mounted on the lathe bed and into which the rotating member 4 projects and through an opening 7 of which the centering pin 5 projects. A gear 8 is attached to the rotating member 4 as by studs 9, best shown in Fig. 9, and includes an annular wall 10 carrying gear teeth 11 and a flange 12 through which the studs 9 extend into a threaded portion 13 of the rotating member 4. The housing 6 is provided with a bearing 14 in which is journaled one end of a shaft 15. Said shaft 15 is held against endwise movement by a suitable collar 16 outside said bearing 14 and a washer 17 on the inside thereof. Mounted on the end of the shaft 15 is a suitable gear 18 fixed to said shaft as by a pin 19. The housing 6 may include a flange 20 and a suitable bracing means for holding said housing rigidly on said lathe bed.

The tailstock 3 may be of the conventional construction and includes any suitable means for attaching it slidably to the lathe bed and a suitable centering pin 21.

The chuck, indicated generally by the numeral 22, is located as shown in Fig. 1 at a point between the headstock and tailstock. The chuck is preferably slidably mounted with respect to the lathe bed and comprises a housing 23 which is provided with an extension 24 which cooperates with a groove 25 in the lathe bed, a rotatable chuck member 26, shown in detail in Figs. 2 and 3, a gear 27, a sleeve 28 and an actuating means for such sleeve denoted generally by the numeral 29.

The housing 23 comprises a wall 30 having a shoulder 31 in the peripheral edge thereof, an annular wall 32 and a plate 33 attached to said annular wall by studs 34. The plate 33 has a shoulder 35 corresponding to the shoulder 31 of the wall 30. Ball races 36 are positioned in said housing against the shoulders 31 and 35.

The rotatable member 26 comprises an annular member having gear teeth 45, shoulders 38 and 39 and flanges 40 and 41 extending outwardly from the central portion as shown best in Fig. 2. The member 26 is provided with radial slots 42 communicating with a central opening 43. We have shown three of the radial slots 42 but a larger number may be employed if desired. A hole 44 communicates at one side with each of the radial slots 42. The member 26 is provided on its periphery with gear teeth 45. Holes 46 are drilled through the annular member 26 to receive pins for mounting dogs 47 for pivotal movement into and out of engagement with the work 48. The dogs 47 are pivoted in the radial slots 42 as by pins 49. In the holes 44, which communicate with the radial slot 42, are attached at one end springs 50 which springs are attached at their other ends to the dogs 47. It will be noted by reference to Fig. 4 that these springs tend to hold the dogs normally in position to grip the work 48.

We have provided means for urging the dogs 47 against the action of the springs 50 when it is desired to release them from engagement with the work. This means comprises a sleeve of substantially the size of the inner opening 43 in the member 26 but which is slidable in such opening. This sleeve indicated by the numeral 28 is held against rotation relative to the member 26 by a key 51 which engages in keyways in the outer surface of the sleeve and the inner surface of the rotating member 26. The fit between the key 51 and its corresponding keyway is such as to allow endwise movement of the sleeve 28. The sleeve 28, best shown in Figs. 7 and 9, comprises a cylindrical or tube-like member having a plurality of openings in its convex face corresponding in number to the number of dogs 47 and each provided with a cam surface 52 which is adapted, when the sleeve is moved endwise in one direction, to engage the dogs 47 to urge them out of work gripping position.

The rotatable member 26 is mounted in the housing 23 by means of ball bearings 53 which engage the ball races 36, and inner ball races 54 which engage the shoulders 38 on the rotating member 26. It will be noted that the shoulders 31 and 38 are adapted to provide a clearance for the moving parts.

We provide means for shifting the sleeve 28 longitudinally which comprises a bearing 55 integral with the housing 23 and having journaled therein a pin 56 on which is mounted a lever 57 provided with a handle 58 and arms 59 which have sleeve engaging faces 60 adapted to slide the sleeve 28 longitudinally when the handle 58 is moved to swing the lever 57 about the pin 56. We have shown the top of the housing 23 as being provided with an elevated portion 62 having ball seats 63 therein and the lever 57 as provided with an opening adapted to receive a spring 64 and a ball 65 which cooperate with the ball seats 63 to hold the lever 57 in either of its extreme positions.

Journaled in the housing 23 is the shaft 15, which is also journaled at its other end in the housing 6. Said shaft 15 is provided with a gear 66 contained within the housing 23, splined on said shaft and meshing with the teeth 45 formed on the member 26.

It will be evident from the foregoing that the dogs 47 are adapted to cooperate with a piece of work, for example, an automobile axle, whether or not such work at the point of engagement with the chuck is exactly symmetrical with respect to the centering line. In practice, the work does not vary greatly in symmetry but the variation is enough that some means must be provided for compensating for it and the mechanism which we have described not only attains this object but also permits both ends of the work to be machined at the same time. In practice, the lathe bed 1 will, of course, be provided with the usual tool holding and feeding mechanism but these have not been shown since they do not form a part of this invention.

It will be evident from the foregoing that we have provided a lathe for the purpose described which is simple in construction, efficient in operation, and while we have shown the preferred embodiment, we do not wish to be limited to the specific structure shown but wish to protect the broader aspects of our invention as defined in the subjoined claims.

Having thus described our invention, what we claim is:

1. In a lathe, a bed, a headstock, a tailstock, an intermediately positioned chuck and means for driving said chuck all associated with said bed, said chuck including external gear teeth and dogs for gripping work, means normally urging said dogs to gripping position and means including a sleeve carried within said chuck and through which said dogs project for moving said dogs to non-gripping position.

2. A chuck for a center drive lathe including a rotatable member, means mounting said member for rotation, gear teeth on said member, a central opening in said member and radial slots communicating with said central opening, dogs carried in said radial slots and having radial movement, means normally urging said dogs inwardly, and means whereby they may be moved outwardly, said last means including a sleeve in said central opening through which said dogs project.

3. A chuck including a rotatable member, means mounting said member for rotation, gear teeth on said member, a central opening in said member extending therethrough and radial slots communicating with said central opening, dogs carried in said radial slots and having radial movement, means normally urging said dogs inwardly, and means whereby they may be moved outwardly, said last means including a sleeve in said central opening, said sleeve having slots through which said dogs project and the slots including cam surfaces.

4. A chuck including a rotatable member, means mounting said member for rotation, gear teeth on the periphery of said member, a central opening in said member and radial slots communicating with said central opening, dogs carried in said radial slots and having radial movement, bores in said member communicating with said slots, springs attached to said dogs and extending through said bores and attached to the wall thereof adjacent the periphery of said member, and means whereby said dogs may be moved outwardly against the action of said springs, said last means including a sleeve in said central opening, said sleeve having slots through which said dogs project and the slots including cam surfaces, said sleeve being slidable and said chuck including means whereby said cams are adapted to engage said dogs to push them outwardly.

5. A chuck including a rotatable member, means mounting said member for rotation, gear teeth on said member, a central opening in said member and radial slots communicating with said central opening, dogs pivoted in said radial slots and having radial movement, means normally urging said dogs inwardly, and means whereby they may be moved outwardly, said last means including a sleeve in said central opening, said sleeve having slots through which said dogs project and the slots including cam surfaces, said sleeve being slidable and said chuck including means whereby said cams are adapted to engage said dogs to push them outwardly, and said chuck including means for sliding said sleeve.

6. A chuck device including a rotatable member, means mounting said member for rotation, gear teeth on said member, a central opening in said member and radial slots communicating with said central opening, dogs carried in said radial slots and having radial movement, means normally urging said dogs inwardly, and means whereby they may be moved outwardly, said last means including a sleeve in said central opening, said sleeve having slots through which said dogs project and the slots including cam surfaces, said sleeve being slidable, said device including movable means for sliding said sleeve, there being means provided for yieldably holding said last means in at least one of its positions.

7. A chuck device including a rotatable member, means mounting said member for rotation, gear teeth on said member, a central opening in said member and radial slots communicating with said central opening, dogs carried in said radial slots and having radial movement, means normally urging said dogs inwardly, and means whereby they may be moved outwardly, said last means including a sleeve in said central opening, said sleeve having slots through which said dogs project and the slots including cam surfaces, said sleeve being slidable, and means for sliding said sleeve from one position in which it permits engagement of the dogs with the work to another position in which it prevents such engagement including a pivoted member having laterally projecting arms adapted to engage the ends of said sleeve, and yieldable latch means for yieldably retaining said pivoted member in either of said positions.

In testimony whereof, we hereunto affix our signatures.

ELMER F. BATTERMAN.
JOS. VERDERBER.